US010391966B2

(12) United States Patent
Kunisada et al.

(10) Patent No.: US 10,391,966 B2
(45) Date of Patent: Aug. 27, 2019

(54) VEHICULAR OCCUPANT RESTRAINING DEVICE

(71) Applicant: TOYOTA JIDOSHA KABUSHIKI KAISHA, Toyota-shi (JP)

(72) Inventors: Masato Kunisada, Susono (JP); Hiroyuki Nagura, Chiryu (JP); Takuma Kawai, Susono (JP); Takayuki Iwakawa, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 53 days.

(21) Appl. No.: 15/648,493

(22) Filed: Jul. 13, 2017

(65) Prior Publication Data

US 2018/0022309 A1 Jan. 25, 2018

(30) Foreign Application Priority Data

Jul. 22, 2016 (JP) ................................ 2016-144901

(51) Int. Cl.
*B60R 21/00* (2006.01)
*B60R 21/26* (2011.01)
(Continued)

(52) U.S. Cl.
CPC ...... *B60R 21/23138* (2013.01); *B60R 21/207* (2013.01); *B60R 21/26* (2013.01);
(Continued)

(58) Field of Classification Search
CPC . B60R 21/23138; B60R 21/207; B60R 21/26; B60R 2021/0058;
(Continued)

(56) References Cited

U.S. PATENT DOCUMENTS 7,681,907 B2 * 3/2010 Svenbrant ............. B60R 21/207 280/728.2
8,702,123 B2 * 4/2014 Mazanek ............. B60R 21/207 280/729

(Continued)

FOREIGN PATENT DOCUMENTS

JP 2008-87631 4/2008
JP 2008-201175 A 9/2008

(Continued)

OTHER PUBLICATIONS

Extended European Search Report dated Dec. 13, 2017 in Patent Application No. 17180349.7.

*Primary Examiner* — Drew J Brown
(74) *Attorney, Agent, or Firm* — Oblon, McClelland, Maier & Neustadt, L.L.P.

(57) ABSTRACT

A vehicular occupant restraining device, that includes: an inside air bag arranged on an inner side, in a vehicle width direction, of a side frame in a side section, the inside air bag receiving a gas supply from a second inflator, the inside air bag deploying by inflation in the side section earlier and at a higher pressure than a side air bag, and the inside air bag pressing a seated occupant to an inner side in the vehicle width direction. The inside air bag is configured so as to deploy by inflation in a region more to a vehicle upper side than a second-from-bottom rib of six ribs provided in a torso of an AM50 type international standard side collision dummy, in a state in which the dummy is seated in the vehicular seat.

8 Claims, 7 Drawing Sheets

(51) Int. Cl.
*B60R 21/207* (2006.01)
*B60R 21/231* (2011.01)

(52) U.S. Cl.
CPC ................. *B60R 2021/0032* (2013.01); *B60R 2021/0039* (2013.01); *B60R 2021/0058* (2013.01); *B60R 2021/23107* (2013.01); *B60R 2021/23146* (2013.01)

(58) Field of Classification Search
CPC .... B60R 2021/0032; B60R 2021/0039; B60R 2021/23146; B60R 2021/23107
See application file for complete search history.

(56) References Cited

U.S. PATENT DOCUMENTS

| | | | | |
|---|---|---|---|---|
| 9,616,791 | B2 * | 4/2017 | Awata | B60N 2/5825 |
| 9,969,351 | B2 * | 5/2018 | Ohno | B60R 21/239 |
| 2004/0232666 | A1 * | 11/2004 | Sato | B60R 21/23138 280/730.2 |
| 2008/0231026 | A1 * | 9/2008 | Naito | B60R 21/23138 280/730.2 |
| 2009/0020988 | A1 | 1/2009 | Sato et al. | |
| 2010/0090448 | A1 * | 4/2010 | Pursche | B60R 21/0134 280/730.2 |
| 2013/0147167 | A1 * | 6/2013 | Kwon | B60R 21/233 280/730.2 |
| 2015/0197212 | A1 | 7/2015 | Fujiwara | |
| 2015/0367804 | A1 * | 12/2015 | Fujiwara | B60R 21/0136 280/730.2 |
| 2017/0036641 | A1 * | 2/2017 | Ohno | B60R 21/263 |
| 2017/0225640 | A1 * | 8/2017 | Ohno | B60R 21/207 |
| 2018/0022308 | A1 * | 1/2018 | Kunisada | B60R 21/01 280/730.2 |

FOREIGN PATENT DOCUMENTS

| | | |
|---|---|---|
| JP | 2009-23494 | 2/2009 |
| JP | 2010-208434 A | 9/2010 |
| JP | 2014-46752 | 3/2014 |
| JP | 2014-80169 | 5/2014 |
| WO | WO 2014/013822 A1 | 1/2014 |

* cited by examiner

VEHICULAR OCCUPANT RESTRAINING DEVICE

CROSS-REFERENCE TO RELATED APPLICATION

This application is based on and claims priority under 35 USC 119 from Japanese Patent Application No. 2016-144901 filed on Jul. 22, 2016, which is incorporated by reference herein.

BACKGROUND

Technical Field

The present disclosure relates to a vehicular occupant restraining device that includes a side air bag.

Related Art

There exists a side air bag device that, during a side collision of a vehicle, causes a side air bag to deploy-by-inflation between an occupant seated in a vehicular seat and a vehicle interior side section, and cushions an impact on the occupant. Such a side air bag device protects a wide range from a shoulder to a belly of the occupant, by a side air bag having a comparatively low internal pressure of a maximum of about 80 kPa, for example. Because the above-described internal pressure is set conforming with a region whose tolerance value is low where there is a risk of an internal organ injury or the like occurring, performance of the side air bag cannot be sufficiently utilized.

That is, in order to achieve a higher safety performance, it is required to move the occupant to an opposite side to a collision place (an inner side in a vehicle width direction) by the side air bag, but in a side air bag of a low internal pressure of about 80 kPa, movement to an inner side in the vehicle width direction of the occupant is gently promoted, and there is a restriction on promotion of movement of the occupant.

In a side air bag device described in Japanese Patent Application Laid-Open Publication No. 2008-087631, an inside air bag (secondary inflating section) is provided in a position displaced more to an inner side in the vehicle width direction than the side air bag (main inflating section). This secondary inflating section deploys-by-inflation in a seat back side section earlier than the main inflating section and presses, from a vehicle rear, the region from a shoulder to a belly of the occupant. As a result, an upper half of a body of the occupant is moved to an obliquely frontward vehicle inner side of the vehicle (an inner side in the vehicle width direction).

However, in the side air bag device described in Japanese Patent Application Laid-Open Publication No. 2008-087631, a pressing region of the occupant due to an auxiliary inflating section is not sufficiently considered, hence there is room for improvement from a viewpoint of effectively moving the upper half of the body of the occupant to an inner side in the vehicle width direction during a side collision.

SUMMARY

The present disclosure has an object of obtaining a vehicular occupant restraining device that can effectively move an upper half of a body of an occupant to an inner side in a vehicle width direction during a side collision.

A vehicular occupant restraining device of an aspect includes: a side air bag arranged on an outer side in a vehicle width direction of a side frame in a side section on an outer side in the vehicle width direction of a seat back of a vehicular seat, the side air bag receiving a gas supply from a first inflator to deploy-by-inflation, the side air bag being interposed between an occupant seated in the vehicular seat and a vehicle interior side section; and an inside air bag arranged on an inner side in the vehicle width direction of the side frame in the side section, the inside air bag receiving a gas supply from a second inflator, the inside air bag deploying-by-inflation in the side section earlier and at a higher pressure than the side air bag, the inside air bag pressing a seated occupant to an inner side in the vehicle width direction, the inside air bag being configured so as to deploy-by-inflation in a region more to a vehicle upper side than a second-from-bottom rib of six ribs provided in a torso of an AM50 type international standard side collision dummy seated in the vehicular seat.

DESCRIPTION OF EMBODIMENT

A vehicular occupant restraining device 10 according to an embodiment of the present disclosure will be described below using FIGS. 1 to 7. Note that an arrow FR, an arrow UP, and an arrow OUT appropriately marked in each of the drawings indicate, respectively, a frontward direction (traveling direction), an upward direction, and an outward direction in a width direction of a vehicle. Hereafter, when description is made using simply directions of front/rear, left/right, and up/down, these are assumed to indicate front/rear in a vehicle front-rear direction, left/right in a vehicle left-right direction (vehicle width direction), and up/down in a vehicle up-down direction, unless otherwise specifically stated.

(Configuration)

Figure 1:
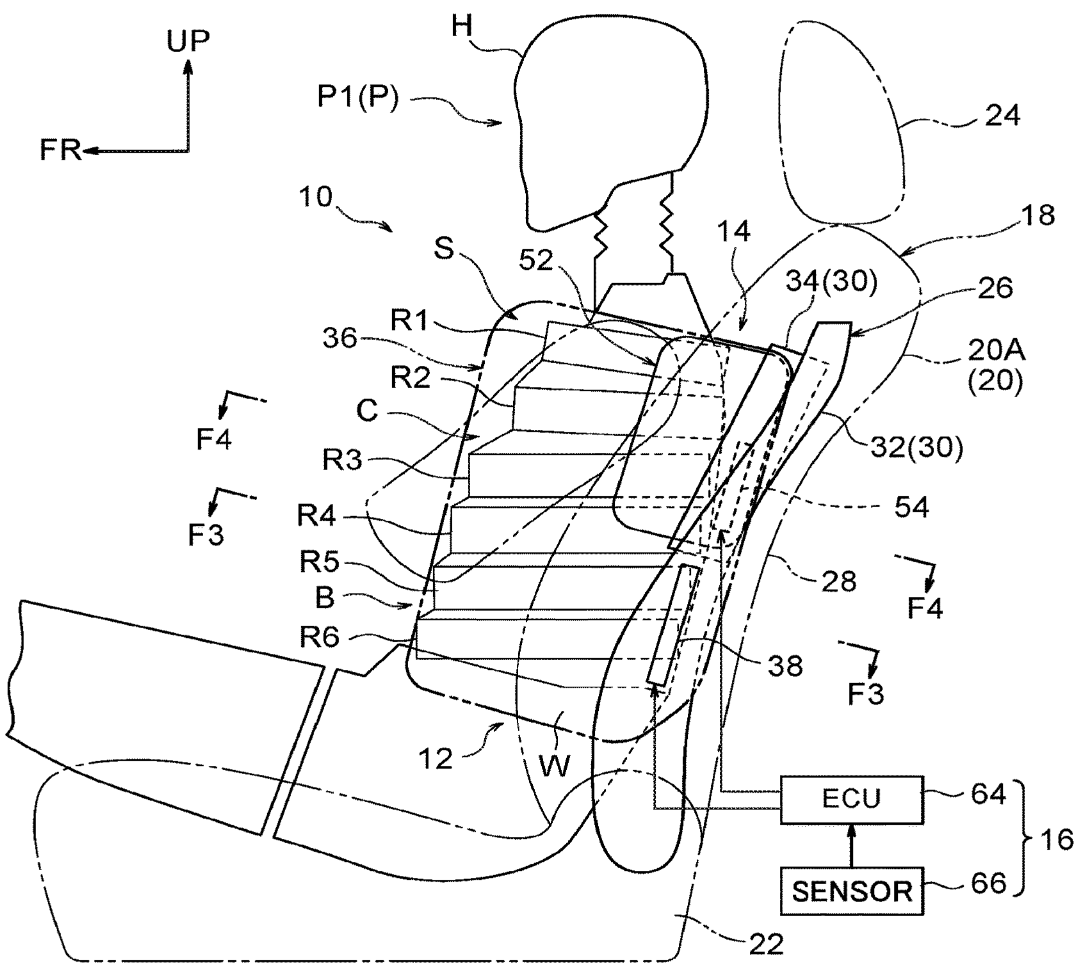
FIG. 1 is a side view showing a state where an AM50 type international standard side collision dummy is sitting in a vehicular seat that has been applied with a vehicular occupant restraining device according to an embodiment of the present disclosure, and is a view showing a deployed-by-inflation state of a side air bag and an inside air bag.
Figure 2:
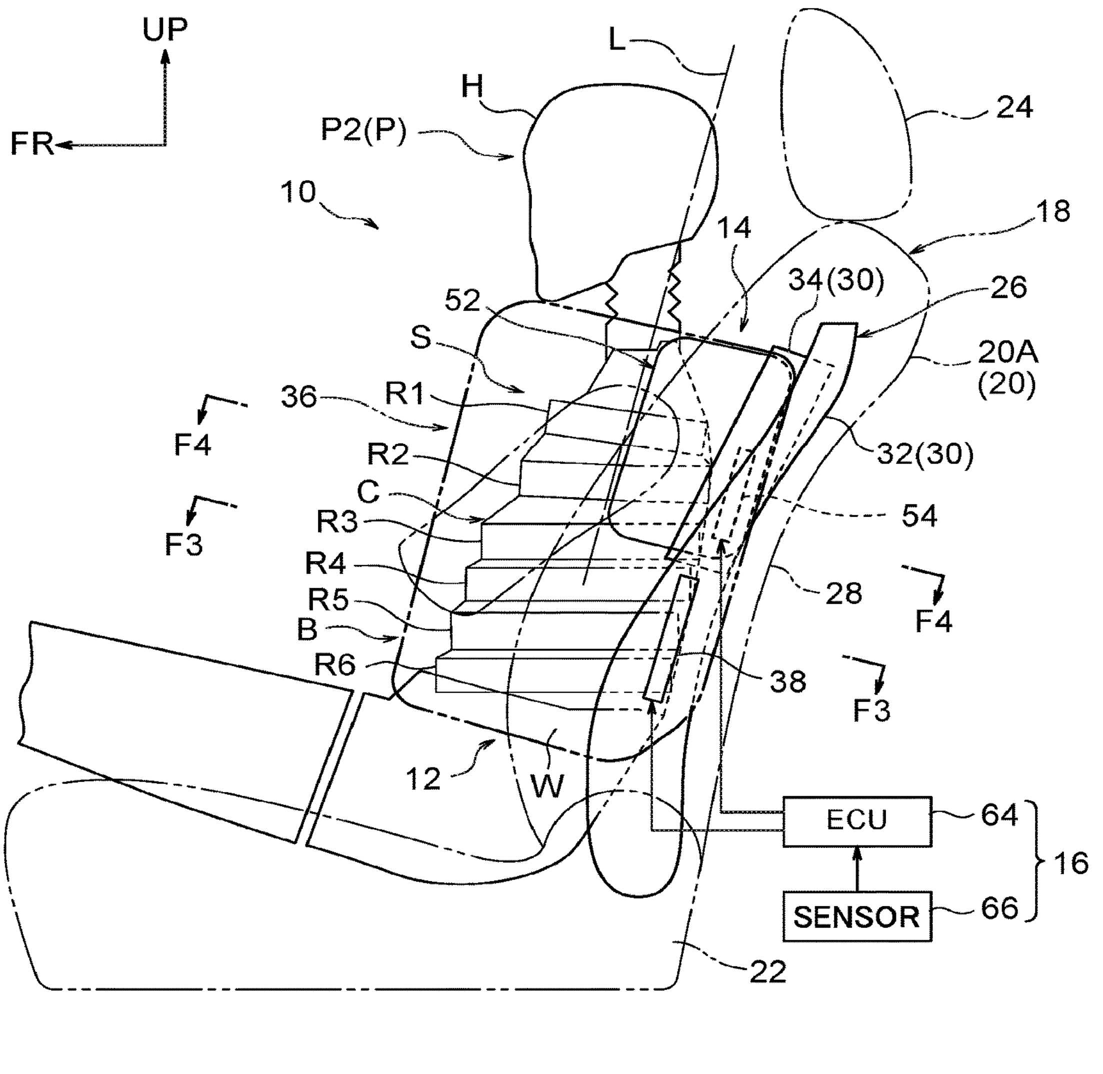
FIG. 2 is a side view showing a state where an AF05 type international standard side collision dummy is sitting in the same vehicular seat, and is a view showing the deployed-by-inflation state of the side air bag and the inside air bag.

As shown in FIGS. 1 and 2, the vehicular occupant restraining device 10 according to the present embodiment includes a side air bag device 12, an inside air bag device 14, and a control device 16. The side air bag device 12 and the inside air bag device 14 are mounted in a seat back 20 of a vehicular seat 18. This vehicular seat 18 is disposed on a left side in a vehicle interior and is assumed to be a driving seat of a left hand drive vehicle or a passenger seat of a right hand drive vehicle. Note that when this vehicular seat 18 is disposed on a right side in a vehicle interior, it has a configuration which is left-right symmetrical to that of the present embodiment.

A lower end section of the seat back 20 of the vehicular seat 18 is joined to a rear end section of a seat cushion 22 via a well-known reclining mechanism. Moreover, a headrest 24 is joined to an upper end section of the seat back 20. A front-rear direction, a left-right direction (width direction), and an up-down direction of this vehicular seat 18 correspond to a front-rear direction, a left-right direction (width direction), and an up-down direction of the vehicle.

Note that in FIGS. 1 and 2, collision test-dedicated dummies P1, P2 are sitting in the vehicular seat 18 instead of an actual occupant. The dummy P1 is an AM50 type (50th percentile of American adult males) of international standard side collision dummy (World Side Impact Dummy: WorldSID). The dummy P2 is an AF05 type (5th percentile of American adult females) of international standard side collision dummy.

The dummies P1, P2 are seated in the vehicular seat 18 in a sitting posture determined by side collision test law, and a front-rear position of the seat cushion 22 with respect to the vehicle and an inclination angle of the seat back 20 with respect to the seat cushion 22 are adjusted to reference setting positions corresponding to the above-described sitting posture. Hereafter, there will be times when the dummy P1 is referred to as "AM50 dummy P1" and the dummy P2 is referred to as "AF05 dummy P2", and there will be times when the dummies P1, P2 are referred to as "occupant P".

The seat back 20 includes: a seat back frame 26, made of a metal, which is a skeletal member; a seat back pad (cushion material) by which the seat back frame 26 is covered; and a seat cover 28 covering the seat back pad. The seat back frame 26 includes: an outer side frame 30 provided in a side section (side support section) 20A on an outer side in the vehicle width direction of the seat back 20; and an inner side frame provided in a side section (side support section) on an inner side in the vehicle width direction of the seat back 20.

Furthermore, the seat back frame 26 includes: an upper frame that links fellow upper end sections of the outer side frame 30 and the inner side frame in a seat width direction; and a lower frame that links fellow lower end sections of the outer side frame 30 and the inner side frame in the seat width direction. The above-described outer side frame 30 corresponds to "side frame" in the present disclosure. Note that in the description below, the above-described side section 20A will be referred to as "outer side section 20A".

The outer side frame 30 is configured by a side frame main body 32 and a reaction force plate 34. The side frame main body 32 includes a side wall section 32A, a front flange section 32B, and a rear flange section 32C, and forms a substantially U-shaped cross section opening to an inner side in the seat width direction, when the seat back 20 is viewed in plane cross section. Note that the aforementioned inner side frame is formed in a shape which is left-right symmetrical to the side frame main body 32.

The side wall section 32A extends in a seat front-rear direction, when the seat back 20 is viewed in plane cross section. The front flange section 32B extends from a front end of the side wall section 32A to a seat width direction inner side and a seat front side, and a tip of the front flange section 32B is bent obliquely to a seat rear side. The rear flange section 32C extends from a rear end of the side wall section 32A to a seat width direction inner side and a seat rear side, and a tip of the rear flange section 32C is bent obliquely to a seat front side. This rear flange section 32C has its dimension in the seat width direction set larger than that of the front flange section 32B, and extends more to an inner side in the seat width direction than the front flange section 32B.

The reaction force plate 34 is formed by, for example, a metal plate undergoing a bending process, is formed in an elongated shape having longitudinally an up-down direction of the seat back 20 looking from the vehicle width direction, and is formed in a substantially J-shaped cross section when the seat back 20 is viewed in plane cross section. In detail, this reaction force plate 34 includes: a plate-like fixing section 34C overlaid from an inner side in the vehicle width direction on the side wall section 32A of the side frame main body 32; a plate-like inwardly-extended-out section 34B that extends from a rear end section of the fixing section 34C to an inner side in the vehicle width direction; and a plate-like reaction force-exerting section 34A that extends obliquely from a vehicle width direction inner side end section of the inwardly-extended-out section 34B to a vehicle front side and a vehicle width direction outer side.

The fixing section 34C is fixed to the side wall section 32A by a means such as welding or bolt fastening. The reaction force-exerting section 34A extends more to the vehicle front side than the side frame main body 32, and is inclined such that the more it heads toward the vehicle front side, the more it heads toward an outer side in the vehicle width direction, when the seat back 20 is viewed in plane cross section. Moreover, the side air bag device 12 is arranged in the outer side section 20A on an outer side in the vehicle width direction of the side frame main body 32, and the inside air bag device 14 is arranged in the outer side section 20A on an inner side in the vehicle width direction of the reaction force-exerting section 34A.

<Configuration of Side Air Bag Device 12>

As shown in FIGS. 1 to 3, 5, and 6, the side air bag device 12 includes a side air bag 36 and a first inflator 38. In the present embodiment, the side air bag 36 is configured as a so-called single chamber type side air bag. This side air bag 36 is formed in a bag shape by, for example, one sheet of a foundation cloth 40, which has been formed by cutting out into a substantially rectangular shape (a substantially elliptical shape) a nylon-based or polyester-based cloth, being folded in two, and an outer peripheral edge section being sewed at a sewed section T1 (refer to FIGS. 5 and 6).

Note that a manufacturing method of the side air bag 36 is not limited to that described above and may be appropriately changed. For example, it is possible to adopt a configuration in which the side air bag 36 is manufactured by having two sheets of a foundation cloth overlaid on each other and their outer peripheral edge sections sewed. Moreover, it is possible to adopt a configuration in which the side air bag 36 is manufactured by, for example, a hollow weaving method (so-called OPW manufacturing method) by an automatic loom. The same applies also to a later-mentioned inside air bag 52.

Figure 3:
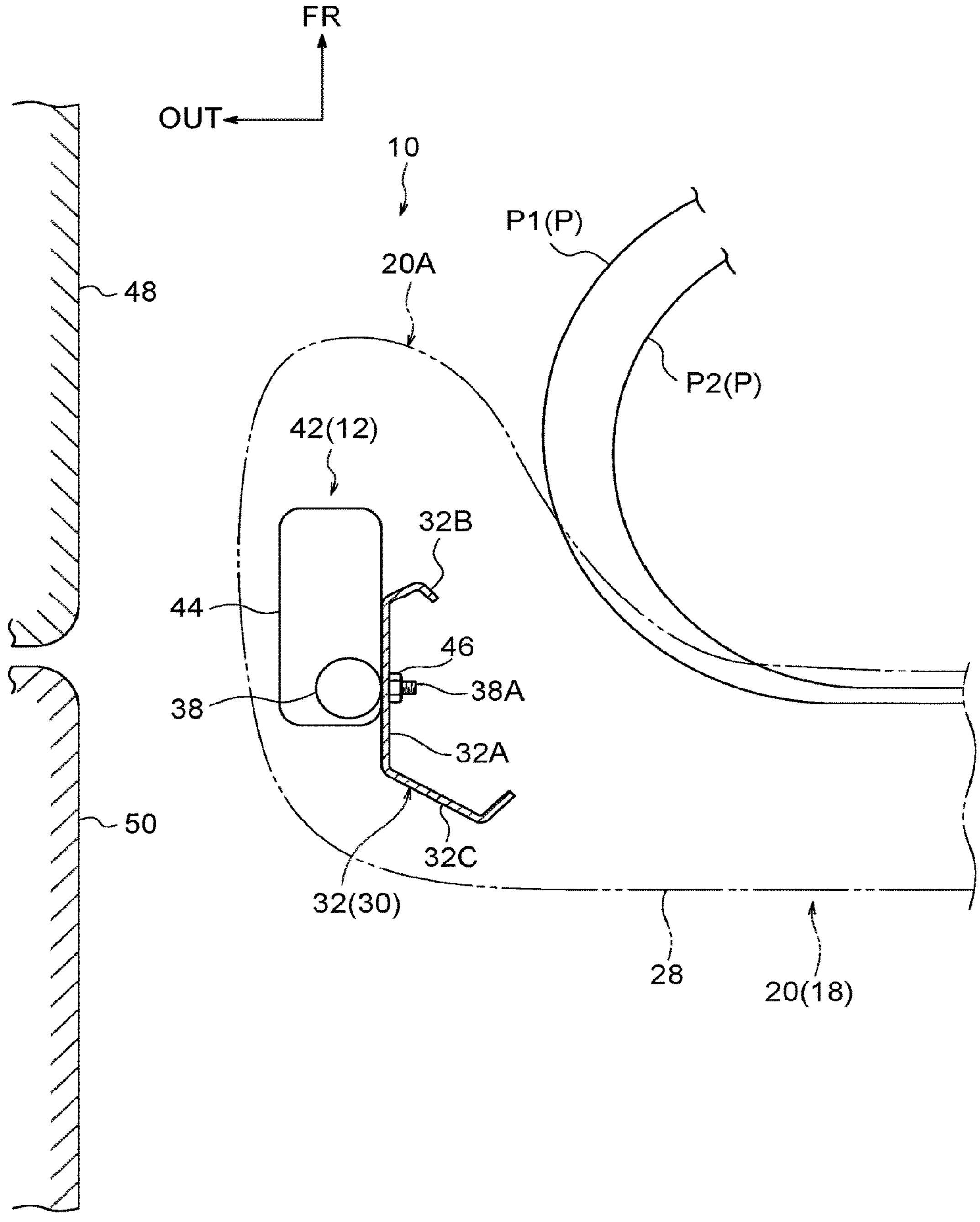
FIG. 3 is an enlarged cross-sectional view showing enlarged a cross section taken along the line F3-F3 of FIG. 1, and is a view showing a state before deployment-by-inflation of the side air bag.
Figure 4:
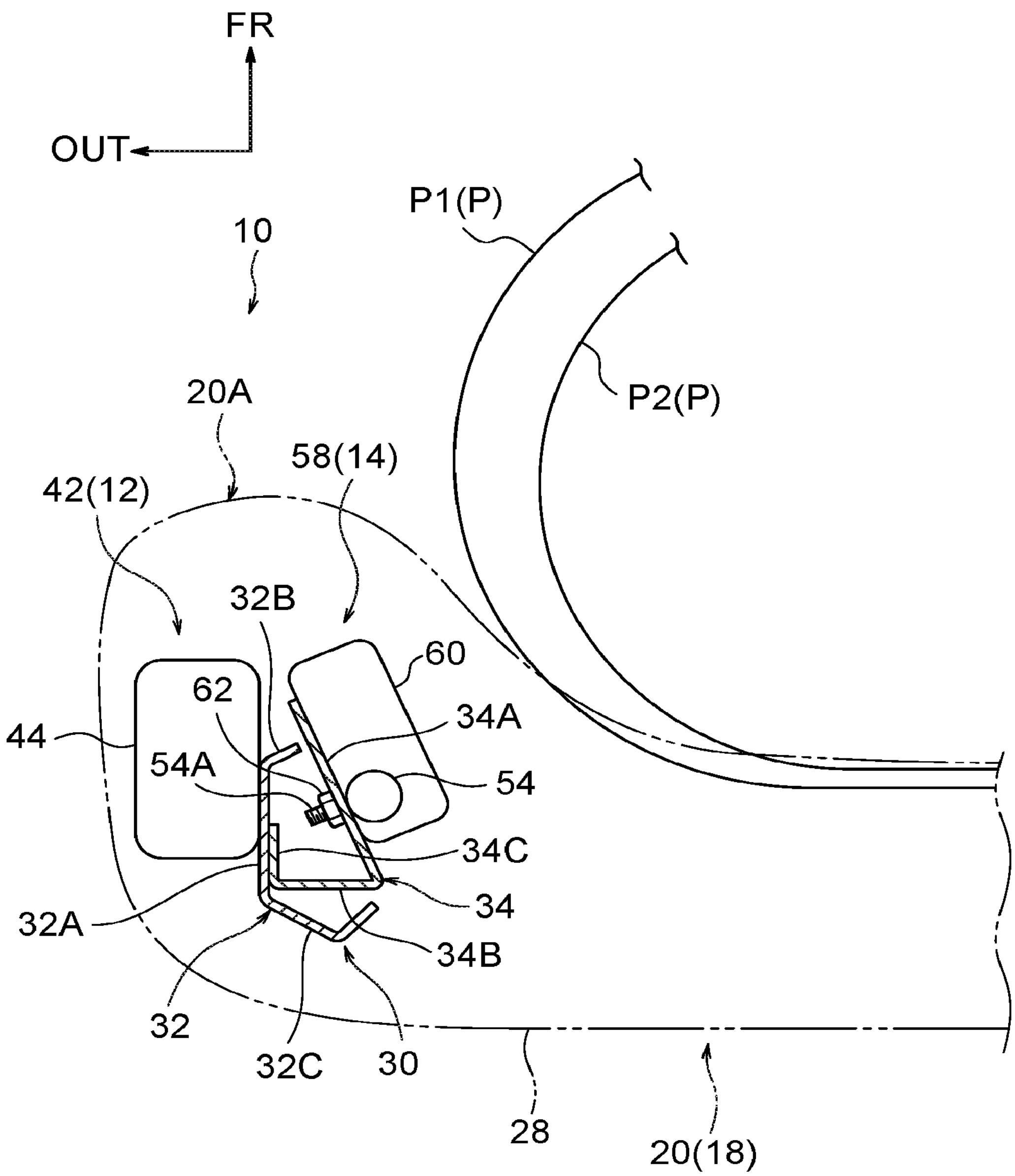
FIG. 4 is an enlarged cross-sectional view showing enlarged a cross section taken along the line F4-F4 of FIG. 1, and is a view showing a state before deployment-by-inflation of the side air bag and the inside air bag.
Figure 5:
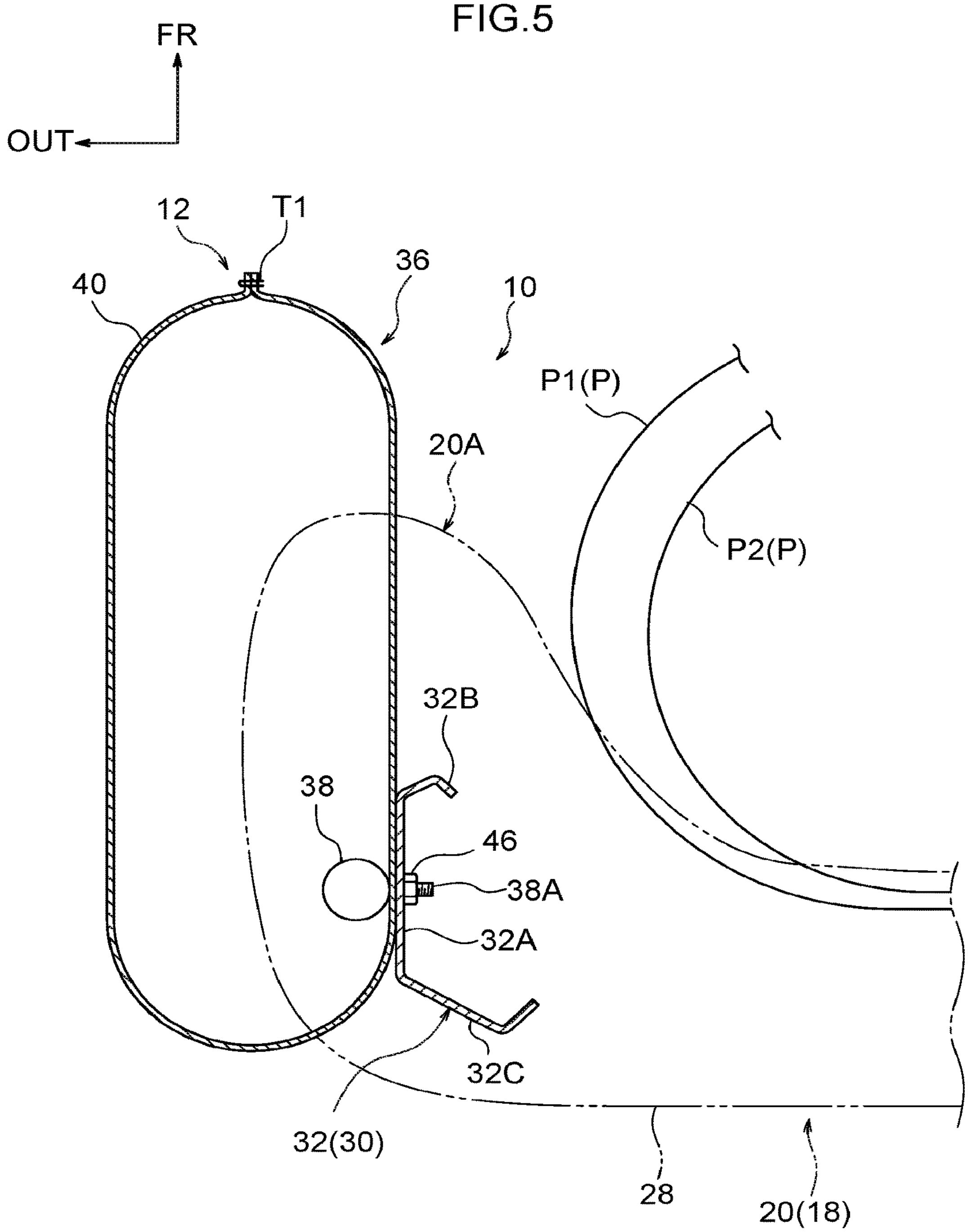
FIG. 5 is a cross-sectional view corresponding to FIG. 3 showing the deployed-by-inflation state of the side air bag.
Figure 6:
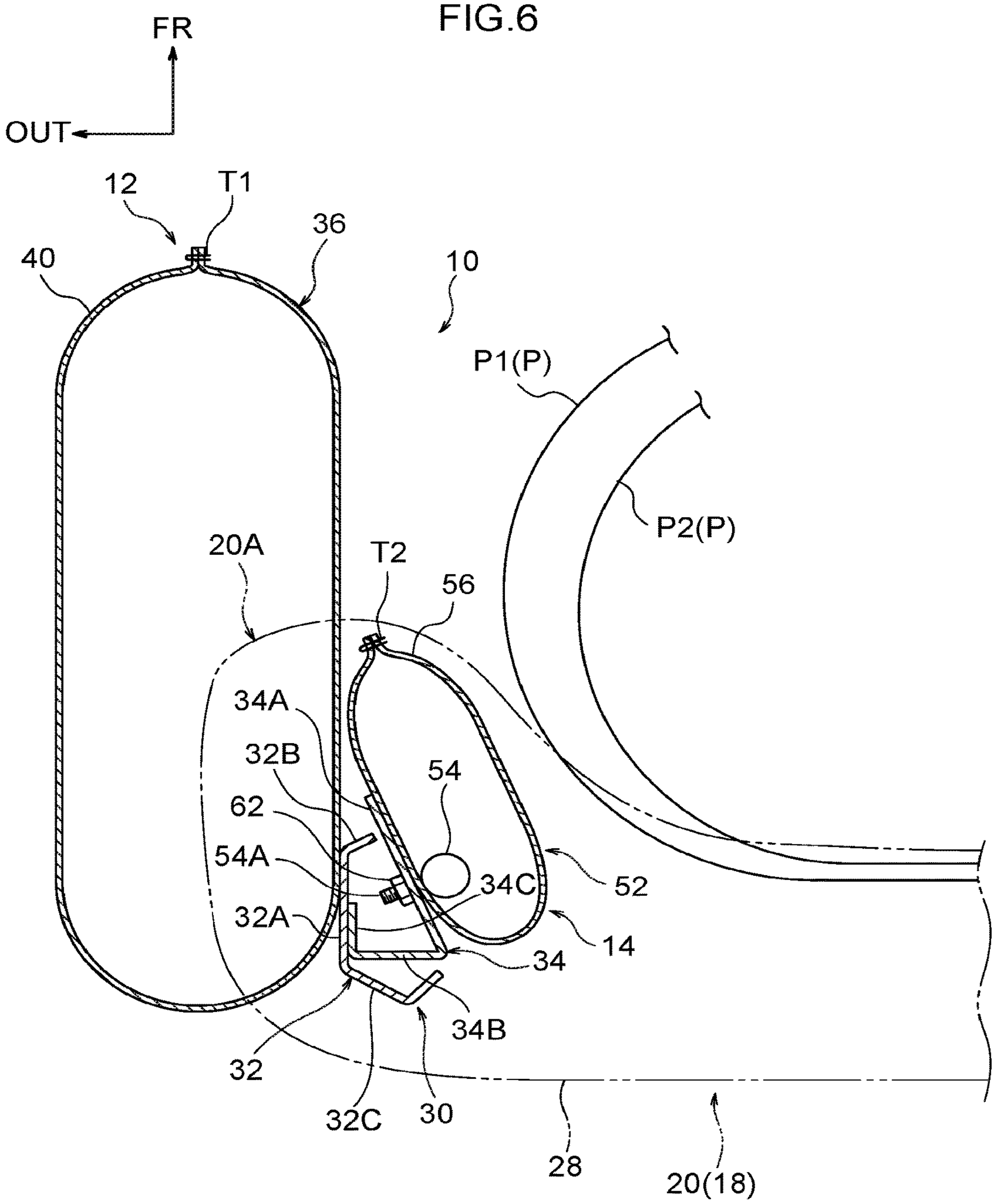
FIG. 6 is a cross-sectional view corresponding to FIG. 4 showing the deployed-by-inflation state of the side air bag and the inside air bag.
Figure 7:
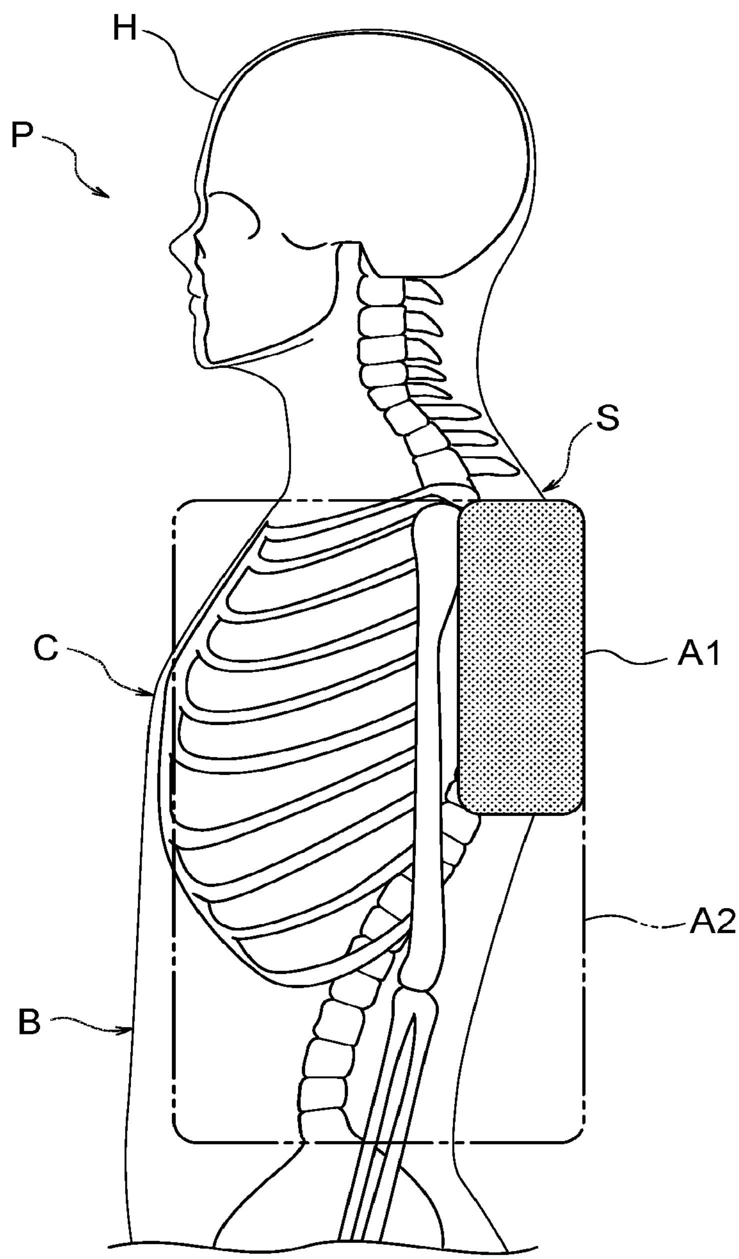
FIG. 7 is a side view for explaining about a pressing place of an occupant by the inside air bag.

This side air bag 36, at a normal time, is configured, along with the first inflator 38, as a first air bag module 42 shown in FIGS. 3 and 4, and is housed in the outer side section 20A. In this first air bag module 42, the side air bag 36 is folded by a certain way-of-folding such as bellow folding or roll folding, and is wrapped by an easily torn wrapping material 44.

The first inflator 38 is a so-called cylinder type inflator and is formed in a circular column shape. This first inflator 38 is disposed on an outer side in the seat width direction (an outer side in the vehicle width direction) of the side wall section 32A of the side frame main body 32, and is housed in a rear end section in the side air bag 36 in a posture that an axial direction of the first inflator 38 is along an up-down direction of the seat back 20. An upper and lower pair of stud bolts 38A (refer to FIGS. 3 and 5) project toward an inner side in the seat width direction from an outer circumferential section of the first inflator 38. These stud bolts 38A penetrate the foundation cloth 40 of the side air bag 36 and the side wall section 32A, and a nut 46 is screwed onto a tip side of each of the stud bolts 38A. As a result, the first inflator 38 is fastened and fixed (so-called side-fastened) to the side frame main body 32, and the side air bag 36 is attached to the side frame main body 32 using the first inflator 38.

A plurality of gas jetting ports aligned in a circumferential direction of the first inflator 38 are formed in an upper end section or a lower end section of the first inflator 38, and when the first inflator 38 is actuated (started up), a gas is jetted radially from the plurality of gas jetting ports. As a result, the gas is supplied to an inside of the side air bag 36, and the side air bag 36 deploys-by-inflation to a vehicle front side of the outer side section 20A and interposes between the occupant P and a vehicle interior side section (here, a door trim 48 of a side door and a B pillar garnish 50 shown in FIG. 3). There is a configuration where at a time of deployment-by-inflation of this side air bag 36, a sewed section provided in the seat cover 28 splits open at a front edge section of the outer side section 20A, and a front section side of the side air bag 36 projects to a seat front side of the outer side section 20A.

When a deployed-by-inflation state of this side air bag 36 is viewed from a side as shown in FIGS. 1 and 2, the side air bag 36 is formed so as to have an elongated substantially rectangular shape (substantially elliptical shape) along the up-down direction of the seat back 20, and is configured capable of restraining, from an outer side in the vehicle width direction, a shoulder S, a chest C, a belly B, and a waist W of the occupant P. A maximum value of internal pressure during deployment-by-inflation of this side air bag 36 is set in a range of 40 kPa to 80 kPa, for example.

<Configuration of Inside Air Bag Device 14>

As shown in FIGS. 1, 2, 4, and 6, the inside air bag device 14 includes the inside air bag 52 and a second inflator 54. In the present embodiment, the inside air bag 52 is configured as a so-called single chamber type side air bag. This inside air bag 52 is formed in a bag shape by, for example, one sheet of a foundation cloth 56, which has been formed by cutting out into a substantially rectangular shape (a substantially elliptical shape) a nylon-based or polyester-based cloth, being folded in two, and an outer peripheral edge section being sewed at a sewed section T2 (refer to FIG. 6).

This inside air bag 52, at a normal time, is configured, along with the second inflator 54, as a second air bag module 58 shown in FIG. 4, and is housed in the outer side section 20A. In this second air bag module 58, the inside air bag 52 is folded by a certain way-of-folding such as bellow folding or roll folding, and is wrapped by an easily torn wrapping material 60. Note that in the description below, front-rear and up-down directions described with reference to the inside air bag 52 indicate directions in a state that the inside air bag 52 has been deployed-by-inflation, and correspond to the front-rear and up-down directions of the seat back 20.

The second inflator 54 is a so-called cylinder type inflator and is formed in a circular column shape. This second inflator 54 is housed in a rear end section in the inside air bag 52, and is disposed in a posture that an axial direction of the second inflator 54 is along the up-down direction of the seat back 20. An upper and lower pair of stud bolts 54A (refer to FIGS. 4 and 6) project toward an outer side in the seat width direction from an outer circumferential section of the second inflator 54. These stud bolts 54A penetrate the foundation cloth 56 of the inside air bag 52 and the reaction force-exerting section 34A, and a nut 62 is screwed onto a tip side of each of the stud bolts 54A. As a result, the second inflator 54 is fastened and fixed to the reaction force-exerting section 34A, and the inside air bag 52 is attached to the reaction force-exerting section 34A using the second inflator 54.

A plurality of gas jetting ports aligned in a circumferential direction of the second inflator 54 are formed in an upper end section or a lower end section of the second inflator 54, and when the second inflator 54 is actuated (started up), a gas is jetted radially from the plurality of gas jetting ports. As a result, the gas is supplied to an inside of the inside air bag 52, and the inside air bag 52 deploys-by-inflation in the outer side section 20A.

When a deployed-by-inflation state of this inside air bag 52 is viewed from a side as shown in FIGS. 1 and 2, the inside air bag 52 is formed so as to have an elongated substantially rectangular shape (substantially elliptical shape) along the up-down direction of the seat back 20. This inside air bag 52 is configured so as to press to an inner side in the vehicle width direction (to restrain from an outer side in the vehicle width direction) a rear section (the shoulder blade and its peripheral section) of the shoulder S and the chest C of the occupant P. Note that in FIGS. 1 to 6, the seat back 20 shown by an imaginary line is illustrated in a shape before deployment-by-inflation of the side air bag 36 and the inside air bag 52. However, the inside air bag 52 has a configuration of deploying-by-inflation in the outer side section 20A while inflating the outer side section 20A to the vehicle width direction inner side and the vehicle front side.

Internal pressure of this inside air bag 52 is set to a higher pressure than the internal pressure of the side air bag 36 and to not more than 200 kPa. In detail, a maximum value of internal pressure of the inside air bag 52 is set in a range of 150 kPa to 200 kPa, for example. Moreover, an internal volume (capacity) of this inside air bag 52 is set sufficiently smaller than an internal volume of the side air bag 36. However, this inside air bag 52 has an internal volume of a degree that, by the inside air bag 52 pressing the rear section of the shoulder S and the chest C to an inner side in the vehicle width direction, the inside air bag 52 moves the upper half of the body of the occupant P to the inner side in the vehicle width direction.

This inside air bag 52 is configured so as to deploy-by-inflation in a region more to a vehicle upper side than a second-from-bottom rib R5 of six ribs R1, R2, R3, R4, R5, R6 provided in a torso of the AM50 dummy P1 (refer to FIG. 1) seated in the vehicular seat 18 and more to a vehicle rear side than a center in the front-rear direction of the shoulder S and the chest C in the AF05 dummy P2 (refer to FIG. 2) seated in the vehicular seat 18. As a result, there is a configuration in which when an occupant having a body build equivalent to the AM50 dummy P1 or the AF05 dummy P2 is sitting in the vehicular seat 18, a shoulder blade and its peripheral section (refer to a dotted region A1 in FIG. 7) where a tolerance value is relatively high in an upper half of a body of said occupant are pressed to an inner side in the vehicle width direction by the inside air bag 52. Note that the above-described region A1 is positioned in a height range of from a first thoracic vertebra to a twelfth thoracic vertebra of the occupant. Moreover, a region A2 shown by a two dot-chain line in FIG. 7 indicates a restraining region of the occupant by the side air bag 36.

A positional relationship of the inside air bag 52 deployed-by-inflation and the AM50 dummy P1 and AF05 dummy P2, will be described in detail below. Note that in the description below, the ribs R1, R2, R3, R4, R5, R6 provided in the torso of the AM50 dummy P1 and the AF05 dummy P2 will sometimes be referred to, in order from the top, as "shoulder rib R1", "chest upper rib R2", "chest middle rib R3", "chest lower rib R4", "belly upper rib R5", and "belly lower rib R6". The shoulder rib R1 is provided in the shoulder S of the AM50 dummy P1 and the AF05 dummy P2, the chest upper rib R2, the chest middle rib R3, and the chest lower rib R4 are provided in the chest C of the AM50 dummy P1 and the AF05 dummy P2, and the belly upper rib R5 and the belly lower rib R6 are provided in the belly B of the AM50 dummy P1 and the AF05 dummy P2.

As shown in FIG. 1, the inside air bag 52 is formed such that when the deployed-by-inflation state of the inside air bag 52 is seen from the vehicle width direction, an upper section of the inside air bag 52 overlaps the shoulder rib R1 of the AM50 dummy P1 and a lower edge section of the inside air bag 52 overlaps the chest lower rib R4 of the AM50 dummy P1. Moreover, as shown in FIG. 2, the inside air bag 52 is formed such that when the deployed-by-inflation state of the inside air bag 52 is seen from the vehicle width direction, a middle section in the up-down direction of the inside air bag 52 overlaps the shoulder rib R1 of the AF05 dummy P2 and the lower edge section of the inside air bag 52 overlaps the chest middle rib R3 of the AF05 dummy P2.

Moreover, as shown in FIG. 2, the inside air bag 52 is formed such that when the deployed-by-inflation state of the inside air bag 52 is seen from the vehicle width direction, a front edge section of the inside air bag 52 is positioned to the vehicle rear side of an imaginary line L passing through centers in the front-rear direction of the chest upper rib R2 and the chest lower rib R4 of the AF05 dummy P2. Furthermore, as shown in FIG. 2, the inside air bag 52 is configured so as to deploy-by-inflation in a region more to a vehicle lower side than a head H (in detail, a lower end of a jaw) of the AF05 dummy P2. Note that a center in the front-rear direction of the chest C of the dummy P2 (refer to the imaginary line L of FIG. 2) is positioned more to the vehicle rear side than a center in the front-rear direction of the chest C of the dummy P1. Moreover, the inside air bag 52 deployed-by-inflation is disposed such that its rear section overlaps the reaction force plate 34, when viewed from the vehicle width direction.

<Configuration of Control Device 16>

As shown in FIGS. 1 and 2, an ECU (Electronic Control Unit) 64 is electrically connected to the aforementioned first inflator 38 and second inflator 54. A side-collision sensor 66 that detects a side collision is electrically connected to this ECU 64. The ECU 64 and the side-collision sensor 66 configure the control device 16. The following are applied as the side-collision sensor 66, namely, for example, a pressure sensor or acceleration sensor arranged in a front side door and a rear side door (an in-door sensor), and an acceleration sensor arranged in a B pillar and in a C pillar (an in-pillar sensor).

When the above-described ECU 64 has detected a side collision of the vehicle based on a signal from the side-collision sensor 66, the ECU 64 activates the second inflator 54 prior to the first inflator 38. Moreover, it is configured that the ECU 64 activates the first inflator 38 at a time point when a preset delay time has elapsed after activating the second inflator 54. As a result, it is configured that the inside air bag 52 deploys-by-inflation in the outer side section 20A prior to the side air bag 36. Note that there may be adopted a configuration in which the second inflator 54 and the first inflator 38 are activated when the side-collision ECU 64 has predicted a side collision based on a signal from a side-collision-predicting (side-collision-forecasting) collision predicting sensor (pre-crash sensor) in the case that such a collision predicting sensor is electrically connected to the side-collision ECU 64. Moreover, there may be adopted a configuration in which the second inflator 54 is activated when a side collision has been predicted, and the first inflator 38 is activated when the side collision has been detected. Applicable as the above-described collision predicting sensor are the likes of a millimeter wave radar or a stereo camera, for example.

(Actions and Effects)

Next, actions and effects of the present embodiment will be described.

In the vehicular occupant restraining device 10 of the above-described configuration, the ECU 64, on detecting the side collision based on the signal from the side-collision sensor 66, actuates the second inflator 54 prior to the first inflator 38. As a result, the inside air bag 52 arranged on an inner side in the vehicle width direction of the outer side frame 30 in the outer side section 20A of the seat back 20 of the vehicular seat 18 receives a gas supply from the second inflator 54 and deploys-by-inflation in the outer side section 20A earlier and at a higher pressure than the side air bag 36. As a result, the occupant P is pressed to an inner side in the vehicle width direction by the inside air bag 52, and is moved to an inner side in the vehicle width direction.

Moreover, the ECU 64 actuates the first inflator 38 when the preset delay time has elapsed after actuating the second inflator 54. As a result, the side air bag 36 arranged on an outer side in the vehicle width direction of the outer side frame 30 in the outer side section 20A of the seat back 20 receives a gas supply from the first inflator 38 to deploy-by-inflation. The side air bag 36 deployed-by-inflation interposes between the occupant P and the vehicle interior side section. As a result, the occupant P is pressed to an inner side in the vehicle width direction by the side air bag 36, and is moved to an inner side in the vehicle width direction. In this case, the occupant P who has been moved to an inner side in the vehicle width direction by the inside air bag 52 in advance is further moved to an inner side in the vehicle width direction by the side air bag 36, hence movement to an inner side in the vehicle width direction of the occupant P is promoted, and an amount of movement to an inner side in the vehicle width direction of the occupant P increases. As a result, protecting performance of the occupant P improves.

Now, the above-described inside air bag 52 is configured so as to deploy-by-inflation in a region more to a vehicle upper side than the belly upper rib R5 second-from-bottom of the six ribs R1, R2, R3, R4, R5, R6 provided in the torso of the AM50 dummy P1 seated in the vehicular seat 18 and more to a vehicle rear side than a center in the front-rear direction of the chest C in the AF05 dummy P2 seated in the vehicular seat 18. As a result, when an occupant having a body build equivalent to the AM50 dummy P1 or the AF05 dummy P2 is sitting in the vehicular seat, a region of a shoulder blade periphery where a tolerance value is relatively high in an upper half of a body of said occupant is pressed to an inner side in the vehicle width direction by the inside air bag 52.

Moreover, in this case, it is avoided that the belly (a region provided with the belly upper rib R5 and the belly lower rib R6 in the AM50 dummy P1 and the AF05 dummy P2) where a tolerance value is relatively low in the upper half of the body of the above-described occupant is pressed to an inner side in the vehicle width direction by the inside air bag 52. This makes it possible for internal pressure of the inside air bag 52 to be set high, conforming with the shoulder blade and its peripheral section where a tolerance value is relatively high. As a result, it becomes possible to effectively move the upper half of the body of the occupant to an inner side in the vehicle width direction.

Moreover, the shoulder blade of the occupant pressed by the inside air bag 52 is a region projecting to the side in the upper half of the body of the occupant, and is easily inputted with a pressing force from the inside air bag 52. Moreover, the shoulder blade of the occupant is positioned in an upper section of the upper half of the body of the occupant, hence when the upper half of the body of the occupant is moved to an inner side in the vehicle width direction centering on the waist W, the upper half of the body of the occupant can be more greatly moved by a smaller force. Therefore, the shoulder blade of the occupant is suitable as a place for pressing by the inside air bag 52.

Furthermore, in the present embodiment, the inside air bag 52 is configured so as to deploy-by-inflation in a region more to a vehicle lower side than the head H of the AF05 dummy P2 seated in the vehicular seat 18. Therefore, when the inside air bag 52 has deployed-by-expansion in a state where an occupant of small build equivalent to the AF05 dummy P2 is sitting in the vehicular seat 18, the head of said occupant can be prevented from receiving a load from the inside air bag 52.

Moreover, in the present embodiment, as previously mentioned, the inside air bag 52 deploys-by-inflation at a higher pressure than the side air bag 36. Setting internal pressure of this inside air bag 52 as high as possible results in an increased effect of moving the upper half of the body of the occupant to an inner side in the vehicle width direction. However, when internal pressure of the inside air bag 52 exceeds 200 kPa, there is a possibility of exceeding a tolerance value of the shoulder blade of the occupant pressed by the inside air bag 52. Particularly, when an occupant of small build equivalent to the AF05 dummy P2 is sitting in the vehicular seat 18, internal pressure of the inside air bag 52 is preferably configured so as not to exceed 200 kPa.

In this regard, in the present embodiment, since internal pressure of the inside air bag 52 is set to 200 kPa or less, the upper half of the body of the occupant can be appropriately moved to an inner side in the vehicle width direction. Note that when an occupant of body build equivalent to or of larger build than the AM50 dummy P1 is sitting in the vehicular seat 18, it is also sometimes possible for internal pressure of the inside air bag 52 to be increased to a maximum of about 240 kPa.

Moreover, in the present embodiment, the outer side frame 30 has the plate-like reaction force-exerting section 34A to which the inside air bag 52 is attached and which exerts a reaction force on the inside air bag 52 from an outer side in the vehicle width direction during deployment-by-inflation. This reaction force-exerting section 34A is inclined such that the more it heads toward a vehicle front side, the more it heads toward an outer side in the vehicle width direction, when the seat back 20 is viewed in plane cross section.

Now, a height at which the above-described reaction force-exerting section 34A is arranged together with the inside air bag 52 is a height equivalent to the shoulder blade of the occupant P, and is on an upper section side of the outer side section 20A of the seat back 20. In the outer side section 20A (side section) of the seat back 20, generally, thickness of a padding material is smaller on an upper section side than on a lower section side. In this regard, in the present embodiment, since the reaction force-exerting section 34A is inclined as described above, it is made easy to secure thickness of the padding material positioned on an occupant side (an inner side in the vehicle width direction) with respect to the inside air bag 52 prior to deployment-by-inflation (refer to second air bag module 58 shown in FIG. 4) attached to said reaction force-exerting section 34A. As a result, it can be prevented or suppressed that a sitting comfort level of the occupant deteriorates due to the reaction force-exerting section 34A.

Supplementary Description of Embodiment

Note that the present embodiment has adopted a configuration in which the reaction force-exerting section 34A provided in the outer side frame 30 is inclined such that the more it heads toward a vehicle front side, the more it heads toward an outer side in the vehicle width direction, when the seat back 20 is viewed in plane cross section. However, the present disclosure is not limited to this.

Moreover, the present embodiment has adopted a configuration in which the outer side frame 30 is configured by: the side frame main body 32; and the reaction force plate 34 attached to said side frame main body 32, and said reaction force plate 34 is provided with the reaction force-exerting section 34A. However, the present invention is not limited to this. That is, there may be adopted a configuration in which the reaction force-exerting section 34A is formed integrally with the side frame main body 32 (a configuration in which part of the side frame main body 32 has been configured as the reaction force-exerting section 34A).

Moreover, the present embodiment has adopted a configuration in which the side air bag 36 has been configured as a so-called single chamber type. However, the present invention is not limited to this, and the configuration of the side air bag may be appropriately changed. For example, there may be adopted a configuration in which the side air bag has been configured as a so-called front-rear two chamber type partitioned into two chambers aligned in the vehicle front-rear direction in the deployed-by-inflation state.

In addition, the present disclosure can be implemented making a variety of modifications in a range not departing from the spirit of the present invention. Moreover, scope of rights of the present disclosure is not limited to the above-described embodiment.

A vehicular occupant restraining device of a first aspect includes: a side air bag arranged on an outer side in a vehicle width direction of a side frame in a side section on an outer side in the vehicle width direction of a seat back of a vehicular seat, the side air bag receiving a gas supply from a first inflator to deploy-by-inflation, the side air bag being interposed between an occupant seated in the vehicular seat and a vehicle interior side section; and an inside air bag arranged on an inner side in the vehicle width direction of the side frame in the side section, the inside air bag receiving a gas supply from a second inflator, the inside air bag deploying-by-inflation in the side section earlier and at a higher pressure than the side air bag, the inside air bag pressing a seated occupant to an inner side in the vehicle width direction, the inside air bag being configured so as to deploy-by-inflation in a region more to a vehicle upper side than a second-from-bottom rib of six ribs provided in a torso of an AM50 type international standard side collision dummy seated in the vehicular seat.

In the first aspect, when, for example, a side collision of a vehicle has been detected, a side air bag arranged on an outer side in a vehicle width direction of a side frame in a side section on an outer side in the vehicle width direction of a seat back of a vehicular seat receives a gas supply from a first inflator to deploy-by-inflation. The deployed-by-inflation side air bag is interposed between an occupant seated in the vehicular seat and a vehicle interior side section. Moreover, in this case, an inside air bag arranged on an inner side in the vehicle width direction of the side frame in the side section receives a gas supply from a second inflator and deploys-by-inflation in the side section earlier and at a higher pressure than the side air bag. As a result, the occupant is pressed to an inner side in the vehicle width direction by the inside air bag, and the side air bag that deploys-by-inflation later than the inside air bag further presses the occupant to an inner side in the vehicle width direction.

Now, the above-described inside air bag is configured so as to deploy-by-inflation in a region more to a vehicle upper side than a second-from-bottom rib (a so-called belly upper rib) of six ribs provided in a torso of an AM50 type international standard side collision dummy seated in the vehicular seat. As a result, when an occupant having a body build equivalent to the above-described AM50 type dummy is sitting in the vehicular seat, a shoulder blade and its peripheral section where a tolerance value is relatively high in an upper half of a body of said occupant are pressed to an inner side in the vehicle width direction by the inside air bag. Moreover, in this case, it is avoided that a belly where a tolerance value is relatively low in the upper half of the body of said occupant is pressed to an inner side in the vehicle width direction by the inside air bag. This makes it possible for internal pressure of the inside air bag to be set high, conforming with the shoulder blade and its peripheral section where a tolerance value is relatively high. As a result, it becomes possible to effectively move the upper half of the body of the occupant to an inner side in the vehicle width direction. Note that the aforementioned inside air bag is preferably configured so as to deploy-by-inflation in a region more to a vehicle rear side than a center in a front-rear direction of a chest in an AF05 type international standard side collision dummy seated in the vehicular seat.

A vehicular occupant restraining device of a second aspect is that of the first aspect, wherein the inside air bag seat is configured so as to deploy-by-inflation in a region more to a vehicle lower side than a head of the aforementioned AF05 type international standard side collision dummy seated in the vehicular seat.

In the second aspect, since the inside air bag is configured as described above, it is possible that when the inside air bag has been deployed-by-inflation in a state where an occupant of small build equivalent to the AF05 type international standard side collision dummy is sitting in the vehicular seat, a head of said occupant is prevented from receiving a load from the inside air bag.

A vehicular occupant restraining device of a third aspect is that of the first or second aspect, wherein internal pressure of the inside air bag is 200 kPa or less.

In the third aspect, the inside air bag deploys-by-inflation at a higher pressure than the side air bag. Setting internal pressure of this inside air bag as high as possible results in an increased effect of moving the upper half of the body of the occupant to an inner side in the vehicle width direction. However, when internal pressure of the inside air bag exceeds 200 kPa, there is a possibility of exceeding a tolerance value of the shoulder blade of the occupant and its peripheral section pressed by said inside air bag. In this regard, in the present invention, since internal pressure of the inside air bag is set to 200 kPa or less, the upper half of the body of the occupant can be appropriately moved to an inner side in the vehicle width direction.

A vehicular occupant restraining device of a fourth aspect is that of any of the first through third aspects, wherein the side frame has a reaction force-exerting section to which the inside air bag is attached and which exerts a reaction force on the inside air bag from an outer side in the vehicle width direction during deployment-by-inflation, and the reaction force-exerting section is inclined such that the more it heads toward a vehicle front side, the more it heads toward an outer side in the vehicle width direction, when the seat back is viewed in plane cross section.

In the fourth aspect, the side frame of the seat back has the above-described reaction force-exerting section. A height at which this reaction force-exerting section is arranged together with the inside air bag is more to a vehicle upper side than the second-from-bottom rib of the six ribs provided in the torso of an AM50 type international standard side collision dummy seated in the vehicular seat, and is on an upper section side of the side section of the seat back. In the side section of the seat back, generally, thickness of a padding material is smaller on an upper section side than on a lower section side. In this regard, in the present disclosure, since the reaction force-exerting section is inclined as described above, it is made easy to secure thickness of the padding material positioned on an occupant side with respect to the inside air bag prior to deployment-by-inflation attached to said reaction force-exerting section. As a result, it can be prevented or suppressed that a sitting comfort level of the occupant deteriorates due to the reaction force-exerting section.

In the vehicular occupant restraining device of the present disclosure, the upper half of the body of the occupant can be effectively moved to an inner side in the vehicle width direction during a side collision.

What is claimed is:

1. A vehicular occupant restraining device, comprising:

a side air bag including a first inflator, the side air bag arranged on an outer side, in a vehicle width direction, of a side frame in a side section on an outer side, in the vehicle width direction, of a seat back of a vehicular seat, the side air bag receiving a gas supply from the first inflator to deploy by inflation, and the side air bag being interposed between an occupant seated in the vehicular seat and a vehicle interior side section; and an inside air bag including a second inflator, the inside air bag arranged on an inner side, in the vehicle width direction, of the side frame in the side section, the inside air bag receiving a gas supply from the second inflator, the inside air bag deploying by inflation in the side section earlier and at a higher pressure than the side air bag, and the inside air bag pressing a seated occupant to an inner side in the vehicle width direction, wherein the inside air bag is configured so as to deploy by inflation in a region more to a vehicle upper side than a second-from-bottom rib of six ribs provided in a torso of an AM50 type international standard side collision dummy, in a state in which the dummy is seated in the vehicular seat, wherein the side frame includes a side frame main body and a reaction force plate that is formed separated from the side frame main body and is fixed to the side frame main body, wherein the reaction force plate has a reaction force exerting section, to which the inside airbag is attached, and which exerts a reaction force from an outer side in a vehicle width direction to the inside air bag when deploying by inflation, and wherein the reaction force exerting section is inclined such that the reaction force exerting section extends toward the vehicle front side as the reaction force exerting section extends toward an outer side in the vehicle width direction when viewed in plane cross section.

2. The vehicular occupant restraining device according to claim 1, wherein the inside air bag is configured so as to deploy by inflation in a region more to a vehicle lower side than a head of an AF05 type international standard side collision dummy in a state in which the dummy is seated in the vehicular seat.

3. The vehicular occupant restraining device according to claim 1, wherein an internal pressure of the inside air bag is 200 kPa or less.

4. The vehicular occupant restraining device according to claim 1, wherein the reaction force plate includes:

a plate like fixing section overlaid from an inner side in the vehicle width direction on the side wall section of the side frame main body, a plate like inwardly extended out section that extends from a rear end section of the fixing section to an inner side in the vehicle width direction, and the plate like reaction force exerting section that extends from the inner side in the vehicle width direction of the inwardly extended out section to the front side of the vehicle and the outer side in the vehicle width direction.

5. The vehicular occupant restraining device according to claim 1, wherein the reaction force exerting section extends more to the vehicle front side than the side frame main body.

6. The vehicular occupant restraining device according to claim 1, wherein:

a maximum value of an internal pressure of the side airbag is set from 40 kPa to 80 kPa, and a maximum value of an internal pressure of the inside airbag is set from 150 kPa to 200 kPa.

7. The vehicular occupant restraining device according to claim 1, wherein:

the first inflator is placed more to the vehicle lower side than the second inflator that supplies a gas to the inside airbag so that the first inflator and the second inflator do not overlap in a vehicle vertical direction.

8. The vehicular occupant restraining device according to claim 7, wherein the second inflator is placed more to the vehicle rear side than the first inflator by offsetting.

* * * * *